(12) United States Patent
Bialer et al.

(10) Patent No.: US 10,551,493 B2
(45) Date of Patent: Feb. 4, 2020

(54) WIDELY SPACED RADAR NODES WITH UNAMBIGUOUS BEAM PATTERN

(71) Applicant: GM Global Technology Operations LLC, Detroit, MI (US)

(72) Inventors: Oded Bialer, Petah Tivak (IL); Amnon Jonas, Jerusalem (IL); Tom Tirer, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 368 days.

(21) Appl. No.: 15/680,329

(22) Filed: Aug. 18, 2017

(65) Prior Publication Data

US 2019/0056491 A1 Feb. 21, 2019

(51) Int. Cl.
*G01S 13/93* (2006.01)
*G01S 13/42* (2006.01)

(52) U.S. Cl.
CPC ............ *G01S 13/931* (2013.01); *G01S 13/42* (2013.01); *G01S 2013/9375* (2013.01)

(58) Field of Classification Search
CPC . G01S 13/931; G01S 13/42; G01S 2013/9375
USPC .......................................................... 342/70
See application file for complete search history.

(56) References Cited

U.S. PATENT DOCUMENTS

| | | | | |
|---|---|---|---|---|
| 4,926,050 A * | 5/1990 | Shemwell | ................ | G01S 11/12 250/559.38 |
| 5,424,742 A * | 6/1995 | Long | .................... | G01O 21/005 342/25 C |
| 5,430,445 A * | 7/1995 | Peregrim | ................ | F41G 7/343 342/25 C |
| 9,285,468 B2 * | 3/2016 | Bilik | ........................ | G01S 15/93 |
| 9,350,074 B2 * | 5/2016 | Linnenbrink | ........ | H01Q 3/2682 |
| 9,678,202 B2 * | 6/2017 | Nagy | ...................... | G01S 13/48 |
| 10,345,439 B2 * | 7/2019 | Bialer | ..................... | G01S 13/87 |
| 2005/0007882 A1 * | 1/2005 | Bachelor | ................ | G01S 15/89 367/103 |
| 2007/0109177 A1 * | 5/2007 | Baath | ..................... | G01S 13/38 342/124 |
| 2008/0040029 A1 * | 2/2008 | Breed | .................. | B60N 2/2863 701/514 |

(Continued)

FOREIGN PATENT DOCUMENTS

| | | | | |
|---|---|---|---|---|
| WO | WO-2008134815 A1 * | 11/2008 | ........... | G01S 13/003 |
| WO | WO-2013131592 A1 * | 9/2013 | ............. | G01S 7/539 |
| WO | WO-2015028804 A1 * | 3/2015 | ............... | G01S 7/41 |

*Primary Examiner* — Vladimir Magloire
*Assistant Examiner* — Nuzhat Pervin
(74) *Attorney, Agent, or Firm* — Cantor Colburn LLP (57) ABSTRACT

A vehicle, a radar system for the vehicle, and method of driving the vehicle. A radar array having plurality of radar nodes is arranged along the vehicle. Each radar node includes a first transmitter at one end of the node, a second transmitter at a second end of the node and a plurality of receivers aligned between the first transmitter and the second transmitter. At least one of an aperture length of the nodes and a spacing between the nodes is a variable parameter. A processor activates a transmitter of the radar array to generate a test pulse, receive, at a receiver of the radar array, a reflection of the test pulse from an object, and determines an angular location of the object from the reflection of the test pulse. A trajectory of the vehicle can be changed using the determined angular location of the object.

20 Claims, 5 Drawing Sheets

(56) References Cited

U.S. PATENT DOCUMENTS

| | | | | |
|---|---|---|---|---|
| 2009/0015463 A1* | 1/2009 | Tschernitz | ............. | G01S 7/036 |
| | | | | 342/146 |
| 2010/0204867 A1* | 8/2010 | Longstaff | ............. | G01S 13/003 |
| | | | | 701/26 |
| 2012/0032834 A1* | 2/2012 | Weeks | .................... | G01S 7/003 |
| | | | | 342/118 |
| 2014/0333472 A1* | 11/2014 | Nagy | ...................... | G01S 13/48 |
| | | | | 342/133 |
| 2014/0369168 A1* | 12/2014 | Max | ..................... | G01S 15/878 |
| | | | | 367/93 |
| 2017/0031013 A1* | 2/2017 | Halbert | .................. | G01S 7/003 |

\* cited by examiner

WIDELY SPACED RADAR NODES WITH UNAMBIGUOUS BEAM PATTERN

INTRODUCTION

The subject disclosure relates generally to a radar system for autonomous operation of a vehicle and, in particular, to a radar array arrangement that provides high angular resolution of radar signals for use in autonomous vehicles.

An autonomous vehicle includes one or more detection systems that are able to detect the presence of an object in the path of the vehicle in order to steer the vehicle with respect to the object. The ability of the autonomous vehicle to avoid the object depends on the quality of various radar parameters obtained from the detection system. One such detection system is a radar system that transmits an electromagnetic signal into a region surrounding the vehicle and receives a reflection of the electromagnetic signal from the object or obstacle. The need for a high level of angular resolution with a reasonable number of radar nodes results in a wide spacing of antennas. However, the wide spacing between antenna elements such as receivers can result in an ambiguity in the measurement of an angle of the object, leading to confusion regarding an actual angular location of the object. Accordingly, it is desirable to provide an array that reduces the ambiguity in an angle of arrival of reflected radar signals.

SUMMARY

In one exemplary embodiment, a radar system for a vehicle is disclosed. The radar system includes a radar array having plurality of radar nodes arranged along a surface of the vehicle, wherein each radar node includes a first transmitter at one end of the node and a second transmitter at a second end of the node with a plurality of receivers aligned between the first transmitter and the second transmitter, wherein at least one of an aperture length of the radar node and a spacing between the node is a variable parameter, and a processor. The processor is configured to activate a transmitter of the radar array to generate a test pulse, receive, at a receiver of the radar array, a reflection of the test pulse from an object, and determine an angular location of the object from the reflection of the test pulse.

In one embodiment, the aperture length of a radar node increases with distance from a central point of the array. The spacing between adjacent radar nodes of this embodiment is either constant or increasing with distance from the central point of the array. In another embodiment, the aperture length of each radar node is the same and a spacing between radar nodes varies with distance from a central point of the array, such as by increasing with distance from a central point of the array. In other embodiments, the spacing between adjacent receivers of a radar node is one of uniform and random. The radar array is arranged on a surface of the vehicle and a direction of alignment of the transmitter and the receiver of the radar node is aligned with a direction of alignment of the plurality of radar nodes. The processor changes a trajectory of the vehicle with respect to the object using the determined angular location of the object.

In another exemplary embodiment, a vehicle is disclosed. The vehicle includes a radar array including a plurality of radar nodes arranged along a surface of the vehicle, wherein each radar node includes a first transmitter at one end of the node and a second transmitter at a second end of the node with a plurality of receivers aligned between the first transmitter and the second transmitter, and wherein at least one of an aperture length of the radar node and a spacing between nodes is varied, and a processor. The processor is configured to activate a transmitter of the radar array to generate a test pulse, receive, at a receiver of the radar array, a reflection of the test pulse from an object, and determine an angular location of the object from the reflection of the test pulse.

In one embodiment, the aperture length of each radar node increases with distance from a central point of the radar array. The spacing between adjacent radar nodes in this embodiment is either constant or increasing with distance from the central point of the array. In another embodiment, the aperture length of each radar node is the same and a spacing between radar nodes varies with distance from a central point of the radar array, such as by increasing the spacing with distance from a central point of the array. In other embodiments, the spacing between adjacent receivers of a radar node is one of uniform and random. The processor changes a trajectory of the vehicle with respect to the object using the determined angular location of the object.

In yet another exemplary embodiment, a method driving a vehicle is disclosed. The method includes transmitting a test pulse from at least one of a first transmitter at one end of a node of a radar array and a second transmitter at another end of the node, the node including a plurality of receivers aligned between the first transmitter and the second transmitter and defining an aperture length, the radar array including a plurality of radar nodes, wherein at least one of an aperture length of the radar nodes and a spacing between nodes is varied, receiving a reflection of the test pulse from an object at a receiver of one of the plurality of nodes, determining an angular location of the object from the reflection of the test pulse from the object; and changing a trajectory of the vehicle with respect to the object using the determined angular location of the object.

In one embodiment, an aperture length of a radar node increases with distance of the radar node from a central point of the array. The spacing between adjacent radar nodes in this embodiment is either a constant spacing or a spacing that increases with distance of the radar nodes from a central point of the array. In another embodiment, a spacing between adjacent receivers of a radar node is one of uniform and random. The radar array is arranged on a surface of the vehicle so that a direction of alignment of the transmitter and the receiver of the radar node is aligned with a direction of alignment of the plurality of radar nodes.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

Figure 1:
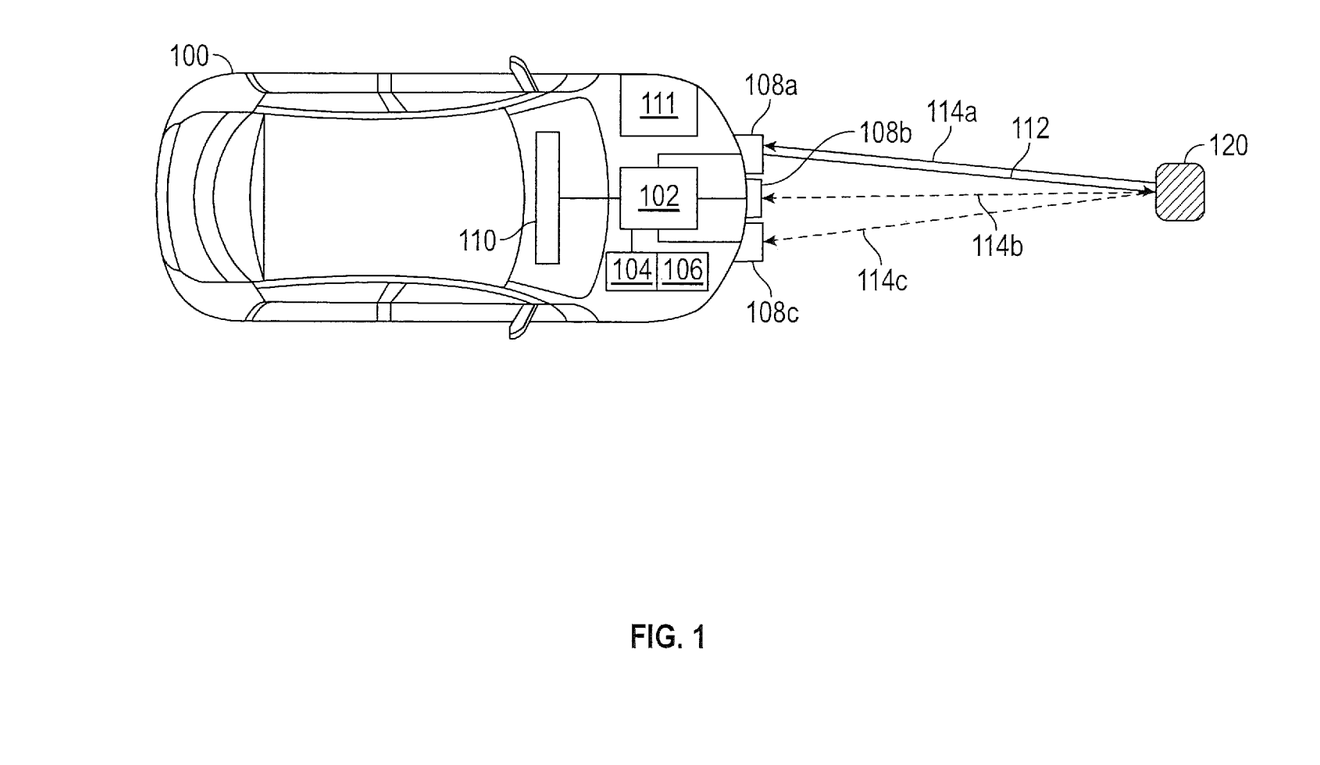
FIG. 1 illustrates a plan view of an exemplary vehicle configured for navigating an environment with respect to an object within the environment.

In accordance with an exemplary embodiment, FIG. 1 illustrates a plan view of an exemplary vehicle 100 configured for navigating an environment with respect to an object 120 within the environment. The vehicle 100 includes a radar system including a radar array of radar nodes 108a, 108b and 108c for obtaining information about one or more objects 120 in the environment. In one embodiment, the radar nodes 108a, 108b, 108c each include transmitters that transmit electromagnetic test pulses into the environment of the vehicle 100 (such as illustrative test pulse 112 transmitted from radar node 108a) and receivers that receive one or more reflections (such as illustrative reflections 114a, 114b and 114c) of the test pulse 112 from one or more objects 120 within the environment. The electromagnetic test pulses can be in a radio frequency range of frequencies.

The vehicle 100 includes a central processor 102 for performing the various methods of data acquisition, data processing and vehicle navigation disclosed herein. The central processor 102 controls the operation of the array of radar nodes (e.g., radar node 108a) to generate a test pulse 112 at a radar node (e.g., radar node 108a) and to process reflections (e.g., reflection 114a) of the test pulse from the one or more objects 120 that are received at the radar node 108a. It is to be understood that the test pulse 112 also results in reflected signals 114b and 114c that are detected at radar nodes 108b and 108c. The processor 102 processes signals in which the reflected signal at any one selected radar node (e.g., radar node 108a) corresponds to a test pulse transmitted from the selected sensor. However the processor 102 can also process signals in which the transmitted test pulse is emitted from one radar node (e.g., radar node 108a) and its corresponding reflected pulse is received at another radar node (e.g., radar nodes 108b, 108c). The processor 102 performs various methods for determining radar parameters of the one or more objects 120, such as its range, relative velocity, angular location, etc.

The processor 102 is further in communication with various internal state sensors 110 of the vehicle 100. The internal state sensors 110 measure various parameters of the vehicle 100, including, but not limited to, a speed of the vehicle 100, a location of the vehicle, a braking parameter indicative of a state of the braking system of the vehicle 100, an acceleration parameter indicative of a propulsion state of the vehicle 100, a steering parameter of the vehicle 100, etc. The processor 102 is further in communication with various actuator devices 111 of the vehicle 100 and can provide a control signal to one or more of the actuator devices 111 in order to control the operation of the vehicle 100 in response to various calculations with respect to the environment and/or the object 120. The various actuator devices 111 include, but are not limited to, a steering actuation device for steering the vehicle 100 in response to a steering signal from the processor 102, an accelerator for providing acceleration to the vehicle 100 in response to an acceleration signal from the processor 102, and a braking device for decelerating the vehicle 100 in response to a braking signal from the processor 102. In another embodiment, the processor 102 may provide information about the environment and/or object 120 to a display to alert a vehicle's driver to the object 120.

The processor 102 is in communication with a memory storage device 104 that includes various programs 106 that, when executed by the processor 102, enable the processor 102 to perform the various methods disclosed herein. In one aspect the programs 106 enable the processor 102 to determine various parameters of an object 120 such as range, relative velocity, angular location, etc. with respect to the vehicle 100 from the reflected signals received at the radar system. The processor 102 can determine from an internal state of the vehicle 100 (as measured by internal state sensors 110) and the determined radar parameters of the object 120, a predicted trajectory of the vehicle 100 with respect to the object 120 as well as a predicted outcome along the predicted trajectory, such as a probability of impact with the object 120. The processor can redirect the vehicle 100 based on the predicted outcome to change the trajectory, thereby obtaining a different outcome, such as avoiding the predicted impact. The processor 102 activates the various actuator devices 111 of the vehicle 100 to redirect the vehicle 100.

The radar array of the vehicle 100 includes a plurality of radar nodes 108a, 108b, 108c, with each node including at least two transmitters and a plurality of receivers, as discussed herein. The radar nodes are mounted on a surface of the vehicle 100.

Figure 2A:
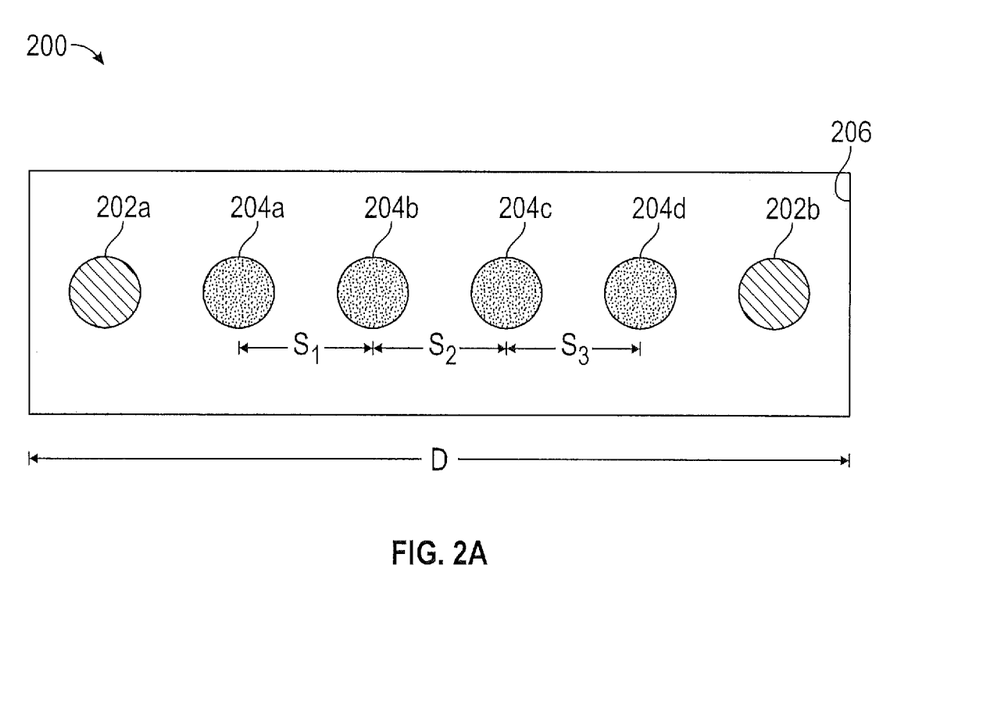
FIG. 2A shows an illustrative radar node of a radar array in one embodiment.

FIG. 2A shows an illustrative radar node 200 of a radar array in one embodiment. The radar node 200 includes at least two transmitters (202a, 202b) and a plurality of receivers (204a, 204b, 204c, 204d). The radar node 200 includes an aperture 206 having a length dimension D. The at least two transmitters (202a, 202b) and the plurality of receivers (204a, 204b, 204c, 204d) are aligned within the aperture 206 along the length dimension D. A first transmitter 202a is placed or located at a first end of the aperture 206 and a second transmitter 20b is placed or located at a second end of the aperture 206. The plurality of receivers 204a, 204b, 204c and 204d are placed between the first transmitter 202a and the second transmitter 202b. Four receivers are shown in FIG. 2A for illustrative purposes only. However, it is to be understood that any number of receivers can be placed or located within a selected node.

The receivers 204a, 204b, 204c, 204d are spaced apart from each other by an inter-receiver spacing. Spacing $S_1$ is a distance between receiver 204a and receiver 204b. Spacing $S_2$ is a distance between receiver 204b and receiver 204c. Spacing $S_3$ is a distance between receiver 204c and receiver 204d. In the embodiment of FIG. 2A, the spacing between receivers is uniform, i.e., $S_1=S_2=S_3$.

Figure 2B:
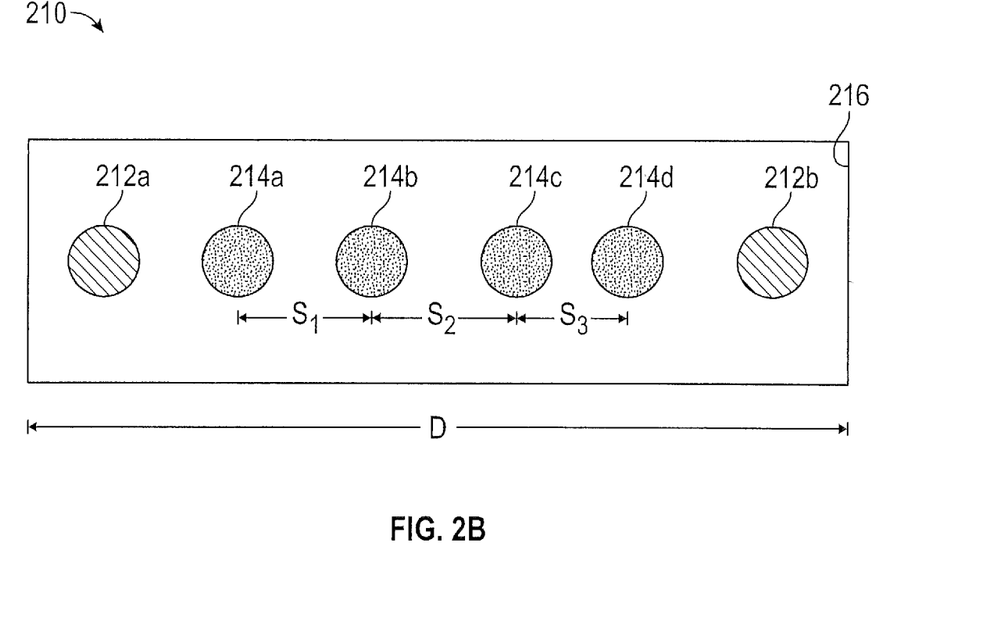
FIG. 2B shows an illustrative radar node of a radar array in another embodiment.

FIG. 2B shows an illustrative radar node 210 of a radar array in another embodiment. The radar node 210 includes an aperture 216 having a length dimension D and has at least two transmitters (212a, 212b) and a plurality of receivers (214a, 214b, 214c, 214d) within the aperture 216 aligned along the length dimension D. A first transmitter 212a is placed or located at a first end of the aperture 216 and a second transmitter 212b is placed or located at a second end of the aperture 216. The plurality of receivers 214a, 214b, 214c and 214d are placed between the first transmitter 212a and the second transmitter 212b. The receivers 214a, 214b, 214c and 214d are spaced apart from each other by spacings S1, S2 and S3 as discussed above with respect to FIG. 2A.

However in the embodiment of FIG. 2B, the spacings S1, S2 and S3 between receivers are randomly determined, selected or assigned. Therefore, spacings S1, S2 and S3 are not equal to each other in general.

Figure 3:
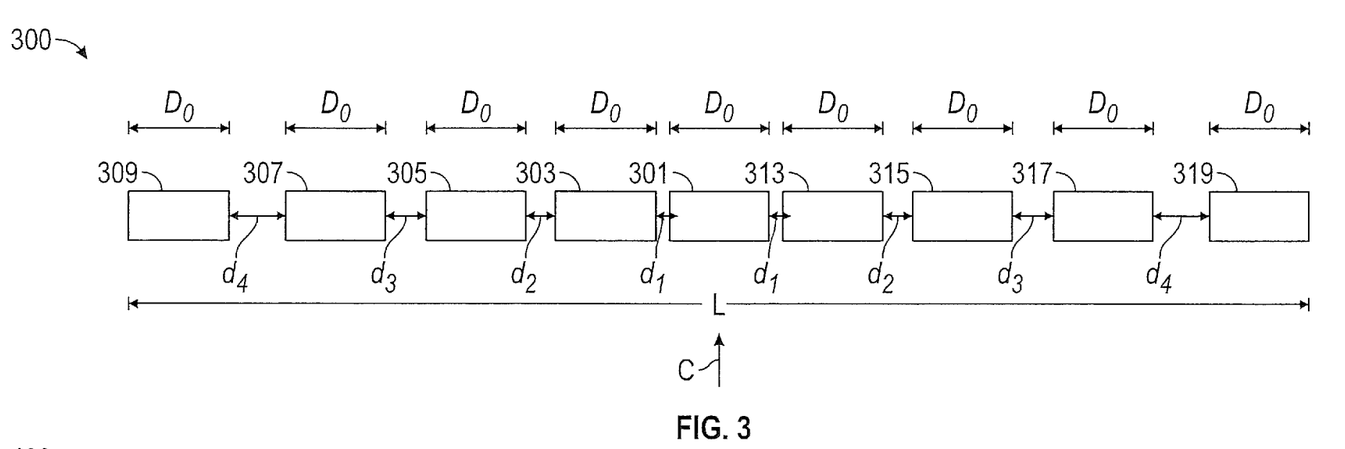
FIG. 3 shows an illustrative radar array showing a selected arrangement of a plurality of radar nodes in one embodiment.

FIG. 3 shows an illustrative radar array 300 showing a selected arrangement of a plurality of radar nodes (301, 303, 305, 307, 309, 313, 315, 317, 319) in one embodiment. The radar nodes (301, 303, 305, 307, 309, 313, 315, 317, 319) are arranged on a surface of the vehicle, which may be a curved surface and a length L of the radar array 300 is measured from the outer edges of the outermost radar nodes (309 and 319). A direction of alignment of the transmitters and receivers of the radar nodes is generally aligned with a direction of alignment of the radar nodes of the radar array. In other words, length dimension D of FIGS. 2A and 2B are generally aligned with length L of FIG. 3. A central point C of the radar array is located at the midpoint halfway along length L. In the illustrative radar array 300, the space between nodes varies with distance from the central point C. In particular, the space between nodes increases with distance from the central point of the radar array 300. The central node 301 is separated on its left side from node 303 by distance $d_1$. Node 303 and node 305 are separated by distance $d_2$. Node 305 and node 307 are separated by distance $d_3$. Node 307 and node 309 are separated by distance $d_4$. On the other side of the array 300, central node 301 is separated on its right side from node 313 by distance $d_1$. Node 313 and node 315 are separated by distance $d_2$. Node 315 and node 317 are separated by distance $d_3$. Node 317 and node 319 are separated by distance $d_4$. The intranode distances are related by $d_1<d_2<d_3<d_4$. It is to be understood that the number of radar nodes shown in radar array 300 is selected only for illustrative purposes and that the radar array 300 can have any number of radar nodes in alternate embodiments.

Each of the radar nodes (301, 303, 305, 307, 309, 313, 315, 317, 319) in radar array 300 has a same aperture length $D_0$. The arrangement of transmitters and receivers within the aperture of the radar nodes can be as shown in either of FIG. 2A and FIG. 2B. In other words, all of the radar nodes can have uniform spacing between the receivers or all of the radar nodes can have random spacing between the receivers or some of the radar nodes can have uniform receiving spacing while the remainder of the radar nodes can have random receiver spacing.

Figure 4:
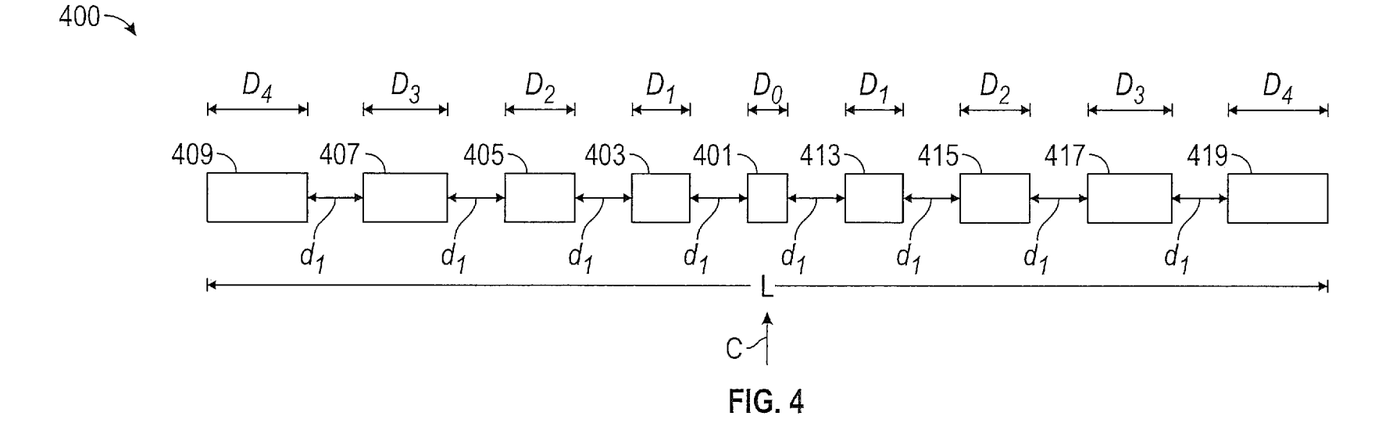
FIG. 4 shows an illustrative radar array showing a different arrangement of plurality of radar nodes than is shown in FIG. 3.

FIG. 4 shows an illustrative radar array 400 showing a different arrangement of plurality of radar nodes (401, 403, 405, 407, 409, 413, 415, 417, 419) than is shown in FIG. 3. The radar nodes (401, 403, 405, 407, 409, 413, 415, 417, 419) are arranged on a surface of the vehicle, which may be a curved surface and a length L of the radar array 400 is measured from the outer edges of the outermost radar nodes (409 and 419). A direction of alignment of the transmitters and receivers of the radar nodes is generally aligned with a direction of alignment of the radar nodes of the radar array. In other words, length dimension D of FIGS. 2A and 2B are generally aligned with length L of FIG. 4. A central point C of the radar array is located halfway along length L. In the illustrative radar array 400, the length of the aperture of each radar node varies with distance from the central point of the radar array 400. In particular, the length of the aperture of a radar nodes increases with distance from the central point of the radar array 400. Central node 401 has aperture length $D_0$. Moving outward on either side of central node 401, nodes 403 and 413 have aperture length $D_1$, nodes 405 and 415 have aperture length $D_2$, nodes 407 and 417 have aperture length $D_3$, and outermost nodes 409 and 419 have aperture length $D_4$. The aperture lengths are related by $D_0<D_1<D_2<D_3<D_4$. It is to be understood that the number of radar nodes shown in radar array 400 is selected only for illustrative purposes and that the radar array 400 can have any number of radar nodes in alternate embodiments. The spacing between nodes can remain constant as shown in FIG. 4 or may vary. In some embodiments, the spacing between apertures increases with distance from the central point C.

The arrangement of transmitters and receivers within the aperture of the radar nodes can be as shown in either of FIG. 2A and FIG. 2B. In other words, all of the radar nodes can have uniform spacing between the receivers or all of the radar nodes can have random spacing between the receivers or some of the radar nodes can have uniform receiving spacing while the remainder of the radar nodes can have random receiver spacing.

It is to be understood that the lengths described in FIG. 3 do not necessarily bear any relation to the lengths described in FIG. 4. For example, the length $D_0$ of the aperture of radar node 301 in FIG. 3 is not necessarily equal to the length $D_0$ of the aperture of radar node 401 in FIG. 4.

Figure 5:
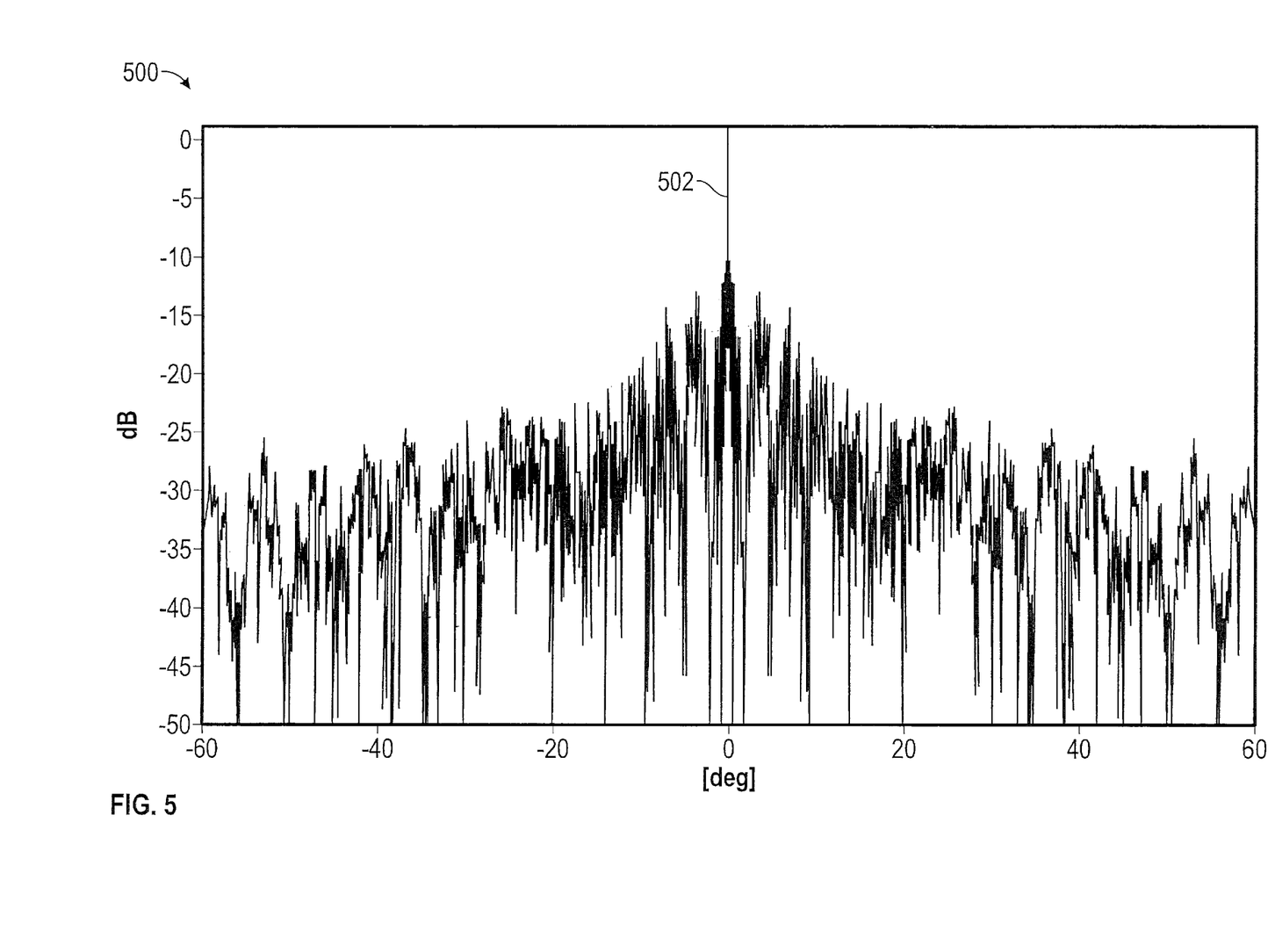
FIG. 5 shows a beam forming simulation of a reflected signal received at radar array having one of the embodiments disclosed herein.

FIG. 5 shows a beam forming simulation 500 of a reflected signal received at a radar array having one of the embodiments disclosed herein. Angle is shown along the abscissa in degrees and intensity is shown along the ordinate axis in decibels. The object reflecting the signal is located at zero degrees azimuth. As can be seen from FIG. 5, a main lobe 502 is shown having a maximum peak that is clearly detectable at zero degrees along the azimuth. Side lobes have significantly lower intensity, thereby allowing the processor to identity main lobe 502 without ambiguity or with significantly reduced ambiguity.

Figure 6:
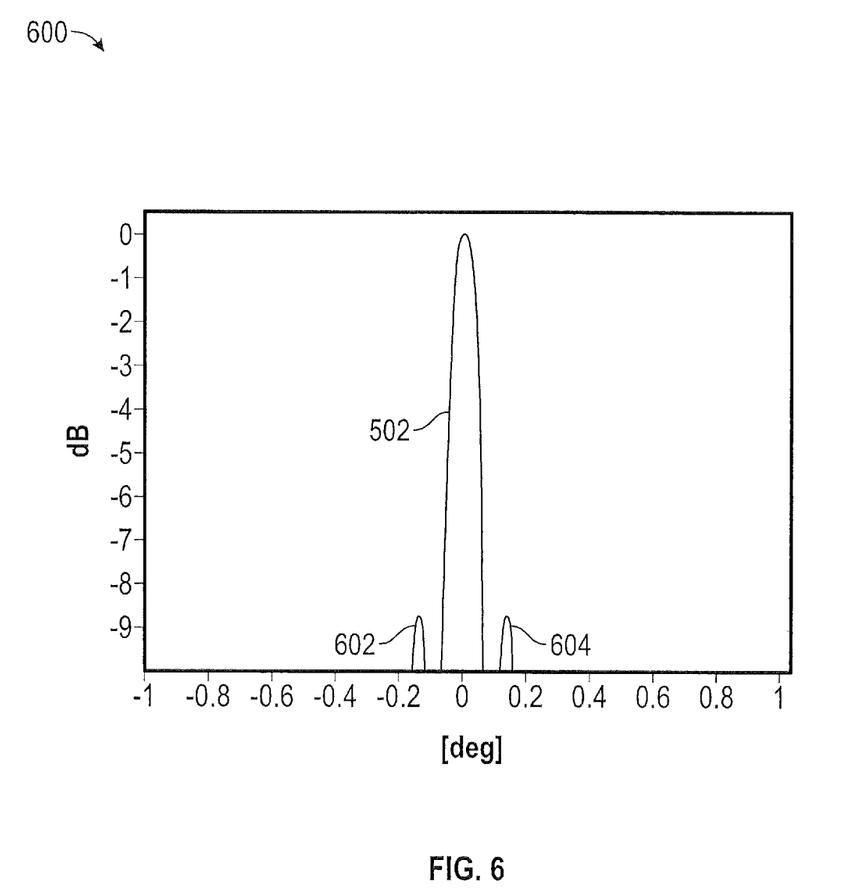
FIG. 6 shows an expanded region of the beam forming simulation of FIG. 5.

FIG. 6 shows an expanded region of the beam forming simulation 500 of FIG. 5. The expanded region extends from −1 degree along the azimuth to +1 degree along the azimuth. The main lobe 502 is clearly distinguishable. The closest side lobes 602 and 604 have an intensity that is about 9 decibels less than the intensity of the main lobe 502. Additionally, side lobes 602 and 604 are with +−0.2 degrees of the main lobe 502. Thus, the main lobe 502 can be identified without ambiguity and can be used to identify an angular location of an object detected by the radar system with a high angular resolution. This high-resolution angular location of the object can thus be used to steer or navigate the vehicle with respect to the object, as discussed above with respect to FIG. 1.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the disclosure not be limited to the particular embodiments disclosed, but will include all embodiments falling within the scope of the application.

What is claimed is:
1. A radar system for a vehicle, comprising:
a radar array having plurality of radar nodes arranged along a surface of the vehicle, wherein each radar node includes a first transmitter at one end of the node and a second transmitter at a second end of the node with a plurality of receivers aligned between the first transmitter and the second transmitter, wherein at least one of an aperture length of the radar node and a spacing between the nodes is a variable parameter; and
a processor configured to:
activate a transmitter of the radar array to generate a test pulse;
receive, at a receiver of the radar array, a reflection of the test pulse from an object; and
determine an angular location of the object from the reflection of the test pulse.

2. The radar system of claim 1, wherein the aperture length of a radar node increases with distance from a central point of the array.

3. The radar system of claim 2, wherein the spacing between adjacent radar nodes is one of (i) constant; and (ii) increasing with distance from the central point of the array.

4. The radar system of claim 1, wherein the aperture length of each radar node is the same and a spacing between radar nodes varies with distance from a central point of the array.

5. The radar system of claim 4, wherein the spacing between radar nodes increases with distance from a central point of the array.

6. The radar system of claim 1, wherein a spacing between adjacent receivers of a radar node is one of uniform and random.

7. The radar system of claim 1, wherein the radar array is arranged on a surface of the vehicle and a direction of alignment of the transmitter and the receiver of the radar node is aligned with a direction of alignment of the plurality of radar nodes.

8. The radar system of claim 1, wherein the processor is further configured to change a trajectory of the vehicle with respect to the object using the determined angular location of the object.

9. A vehicle, comprising:
a radar array including a plurality of radar nodes arranged along a surface of the vehicle, wherein each radar node includes a first transmitter at one end of the node and a second transmitter at a second end of the node with a plurality of receivers aligned between the first transmitter and the second transmitter, and wherein at least one of an aperture length of the radar node and a spacing between nodes is varied; and
a processor configured to:
activate a transmitter of the radar array to generate a test pulse;
receive, at a receiver of the radar array, a reflection of the test pulse from an object; and
determine an angular location of the object from the reflection of the test pulse.

10. The vehicle of claim 9, wherein the aperture length of each radar node increases with distance from a central point of the radar array.

11. The vehicle of claim 10, wherein the spacing between adjacent radar nodes is one of (i) constant; and (ii) increasing with distance from the central point of the array.

12. The vehicle of claim 9, wherein the aperture length of each radar node is the same and a spacing between radar nodes varies with distance from a central point of the radar array.

13. The vehicle of claim 12, wherein the spacing between radar nodes increases with distance from a central point of the array.

14. The vehicle of claim 9, wherein a spacing between adjacent receivers of a radar node is one of uniform and random.

15. The vehicle of claim 9, wherein the processor is further configured to change a trajectory of the vehicle with respect to the object using the determined angular location of the object.

16. A method of driving a vehicle, comprising:
transmitting a test pulse from at least one of a first transmitter at one end of a node of a radar array arranged on the vehicle and a second transmitter at another end of the node, the node including a plurality of receivers aligned between the first transmitter and the second transmitter and defining an aperture length, the radar array including a plurality of radar nodes, wherein at least one of an aperture length of the radar nodes and a spacing between nodes is varied;
receiving a reflection of the test pulse from an object at a receiver of one of the plurality of nodes;
determining an angular location of the object from the reflection of the test pulse from the object; and
changing a trajectory of the vehicle with respect to the object using the determined angular location of the object.

17. The method of claim 16, wherein an aperture length of a radar node increases with distance of the radar node from a central point of the array.

18. The method of claim 17, wherein spacing between adjacent radar nodes is one of (i) a constant spacing; and (ii) a spacing that increases with distance of the radar nodes from a central point of the array.

19. The method of claim 16, wherein a spacing between adjacent receivers of a radar node is one of uniform and random.

20. The method of claim 16, wherein the radar array is arranged on a surface of the vehicle so that a direction of alignment of the transmitter and the receiver of the radar node is aligned with a direction of alignment of the plurality of radar nodes.

* * * * *